(12) United States Patent
Kummer

(10) Patent No.: US 6,571,923 B2
(45) Date of Patent: Jun. 3, 2003

(54) CLUTCH ADJUSTMENT TRAVEL STOP

(75) Inventor: Martin E. Kummer, Auburn, IN (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/943,491

(22) Filed: Aug. 30, 2001

(65) Prior Publication Data

US 2003/0042102 A1 Mar. 6, 2003

(51) Int. Cl.$^7$ .......................... F16D 13/54; F16D 13/00
(52) U.S. Cl. ..................... 192/30 W; 192/70.25; 192/105 C; 192/105 CP
(58) Field of Search .............. 192/70.25, 105 CP, 192/105 C, 109 R, 30 W

(56) References Cited

U.S. PATENT DOCUMENTS

| | | | | |
|---|---|---|---|---|
| 2,108,969 A | * | 2/1938 | Lewis | 192/105 C |
| 5,174,426 A | * | 12/1992 | Thirion de Briel et al. | 192/107 C |
| 5,299,663 A | * | 4/1994 | Kobayashi et al. | 188/1.11 W |
| 5,564,542 A | * | 10/1996 | Gochenour et al. | 192/111 A |
| 5,595,275 A | * | 1/1997 | Gochenour et al. | 192/111 A |
| 5,727,666 A | * | 3/1998 | Maucher | 192/111 A |
| 5,743,367 A | * | 4/1998 | Hofmann et al. | 192/109 R |
| 5,971,126 A | * | 10/1999 | Hashimoto | 192/111 A |
| 6,296,099 B1 | * | 10/2001 | Gochenour | 192/111 A |

\* cited by examiner

*Primary Examiner*—Rodney H. Bonck
*Assistant Examiner*—Eric M Williams
(74) *Attorney, Agent, or Firm*—Rader, Fishman & Grauer PLLC

(57) ABSTRACT

A clutch travel stop limits the amount of vehicular clutch travel adjustment normally permitted for compensating clutch component wear. The stop is attached to a centrifugal weight and roller clutch actuation module to control the amount of permissible wear of clutch components including, for example, friction plate linings. In one embodiment, the stop is defined by a protuberance, such as an integrally formed radially extending lug integrally affixed to an outer circumferential periphery of the housing of the centrifugal module. The lug is positioned to arrest relative movement between respective flanges of a clutch cover and the centrifugal module to limit adjustment of the clutch so that an over-adjustment condition is avoided. Potential damage to critical clutch components is thereby minimized, such as damage to flywheel and pressure plate components caused by fasteners that become exposed after clutch linings retained by the fasteners to the friction disc have become worn.

9 Claims, 4 Drawing Sheets

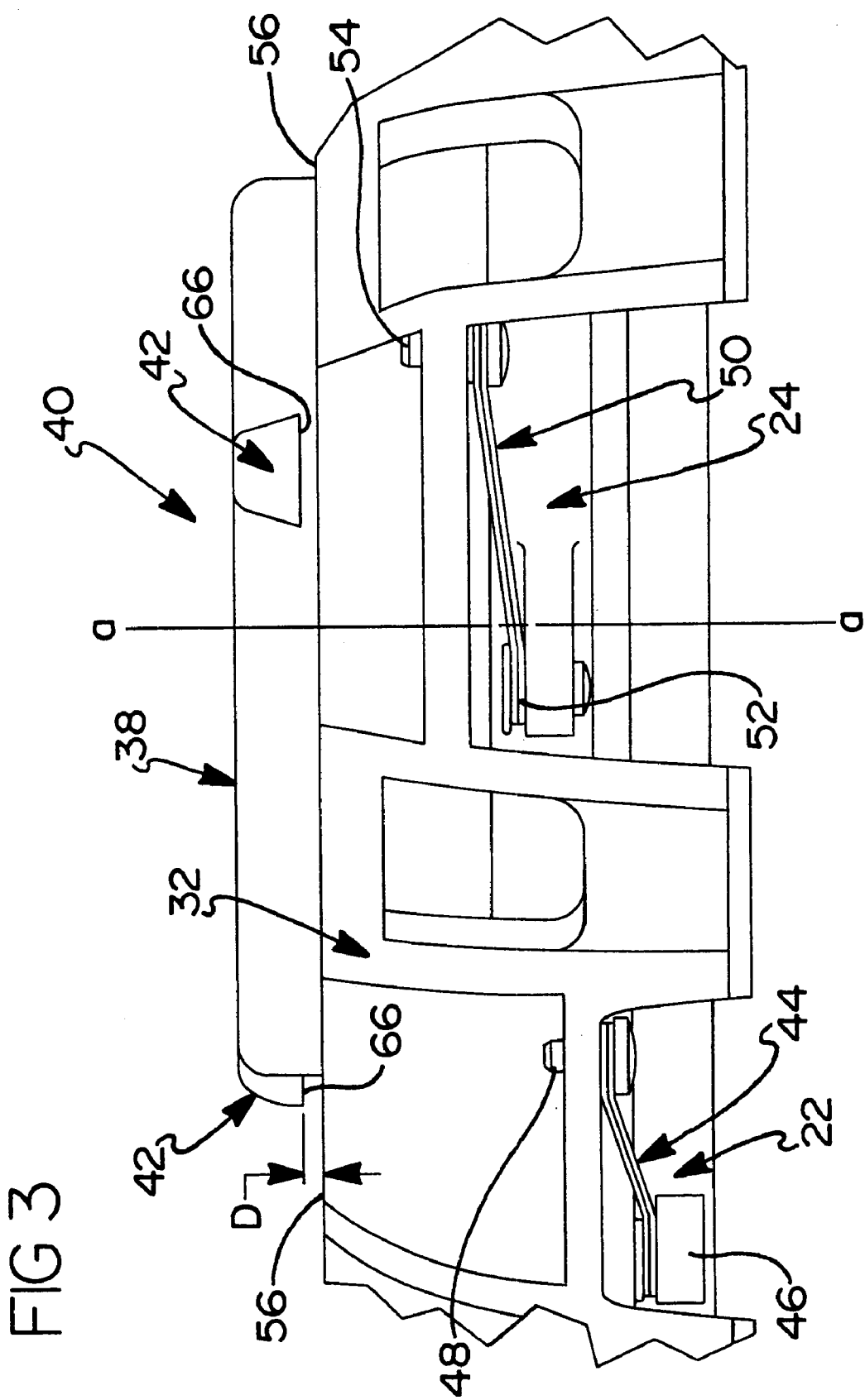

CLUTCH ADJUSTMENT TRAVEL STOP

BACKGROUND OF THE INVENTION

1. Field of Invention

The present invention relates to vehicular clutch adjustments made to compensate for increased clutch component travel resulting from clutch wear, and to overall enhancements in the utility of automatic wear compensation mechanisms used in clutches for such purposes. More particularly, the invention relates to a device for limiting an otherwise permissible amount of wear adjustment of a centrifugal clutch, so that an over-adjustment condition may be avoided, and potential for damage to critical clutch components may be reduced.

2. Description of the Prior Art

Clutch wear mechanisms of the type affixed to vehicular clutch covers are used to compensate for clutch friction lining wear over the functional life of a clutch. In centrifugal clutches, such mechanisms are typically directly affixed between clutch covers of vehicular clutch assemblies and housings of centrifugal weight and roller modules, and are secured to the respective structures via traditional fasteners, including rivets or bolts.

Although clutch wear compensation mechanisms have improved over time, such mechanisms have not always been successful in protecting critical components of the clutch under conditions of extreme wear, particularly the clutch linings associated with rotary clutch friction plates or discs. In some instances, the fasteners, such as rivets for example, that secure the linings to the discs become exposed after the linings are worn. The exposed rivets then become prone to causing mechanical damage to the flywheel and pressure plate surfaces.

SUMMARY OF THE INVENTION

The present invention provides a clutch travel limit or stop for a vehicular clutch to limit amount of clutch travel adjustment otherwise normally permitted for compensation of clutch component wear. The stop is employed in such clutches to limit the amount of permissible wear of the internal clutch components, such as friction disc linings. In addition, the stop is employed to eliminate or reduce the effect of over-adjustment of the clutch via a cam segment wear compensation mechanism.

In one described embodiment, the stop is defined by a protuberance, such as an integrally formed lug, fixed to an outer circumferential periphery of the housing of a centrifugal weight and roller compensation module. The lug is positioned proximally to a clutch flywheel ring or attached clutch cover segment for limiting axial travel of the ring relative to the module housing, and in turn for limiting amount of permissible adjustment of the clutch so that an over-adjustment due to an overworn condition may be avoided. Potential damage to critical clutch components is thereby minimized, such as damage to flywheel and pressure plate components caused by exposed fasteners, such as rivets, after the clutch linings secured by the rivets to the friction disc have become substantially worn.

BRIEF DESCRIPTION OF THE DRAWINGS

FIG. 3 is a side view of the same embodiment revealing additional components of the clutch assembly of FIG. 1.

DETAILED DESCRIPTION OF THE EMBODIMENTS

Figure 1:
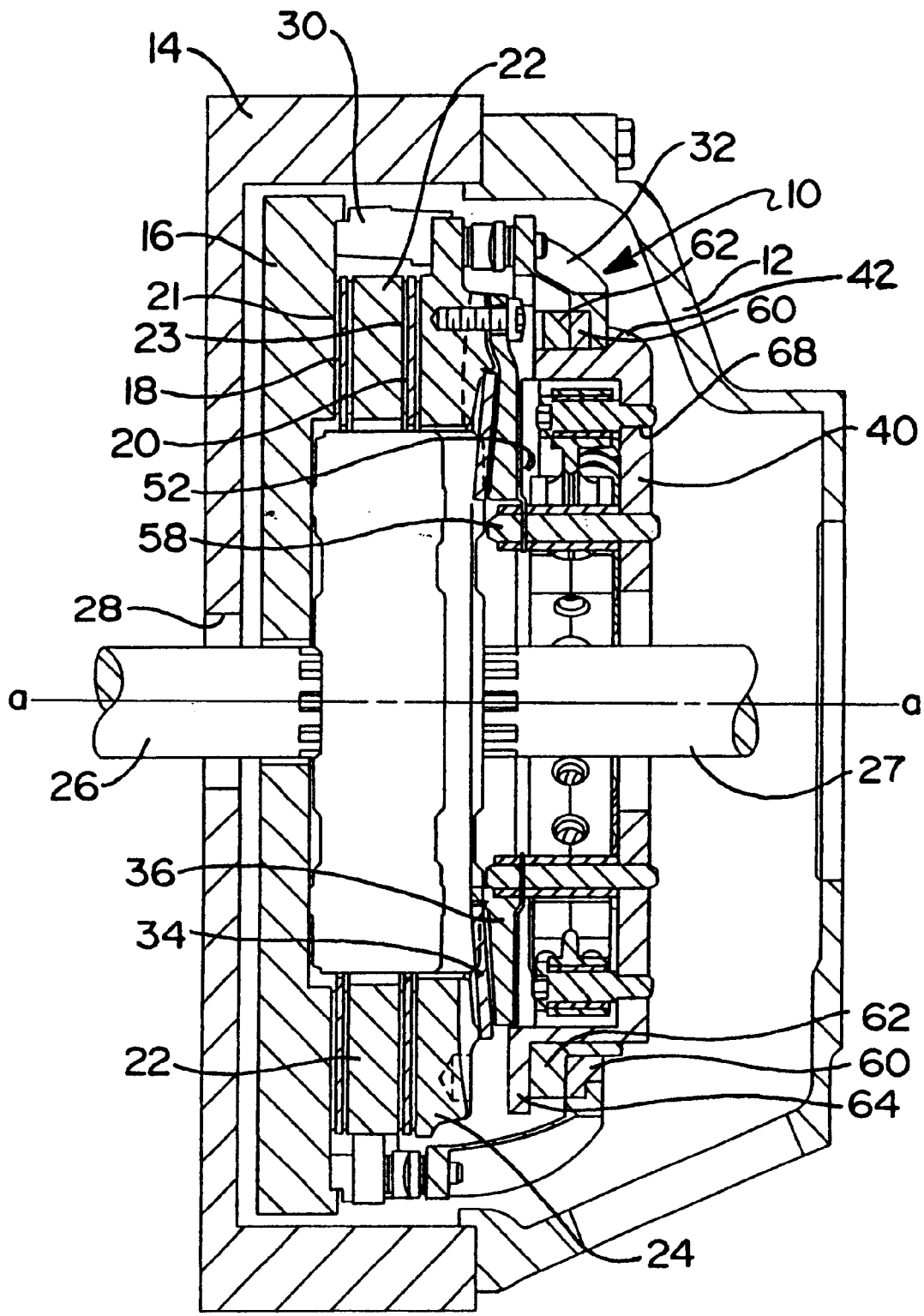
FIG. 1 is a cross-sectional view of a normally open centrifugal clutch assembly that includes the clutch adjustment travel stop of the present invention.

Referring initially to FIG. 1, an automatically actuated centrifugal clutch assembly 10 is designed for use in a motor vehicle, not shown. The clutch 10 is enshrouded between a bell housing 12 of a transmission (also not shown) and a flywheel shroud or housing 14 coupled externally to the bell housing 12. The centrifugal clutch 10 is of the normally unengaged type that relies upon engine speed to initiate actuation, and hence engagement. The clutch is normally used with an electromechanical style automatic transmission, and is employed in vehicles that are normally without a clutch pedal.

The flywheel housing 14 envelops an engine flywheel 16 that is bolted to an engine crankshaft 26 for direct rotation therewith. In the embodiment described, a pair of friction plates 18, 20 includes bonded friction linings 21, 23 secured by traditional fasteners including rivets, bolts, or welds. The friction plates are adapted to be releasably clasped between the flywheel 16, an intermediate plate 22, and a pressure plate 24. The friction plates 18, 20 are directly attached to and rotate with a transmission input shaft 27. Those skilled in the art will appreciate that the transmission input shaft 27 is positioned coaxially with respect to the engine crankshaft 26, but is axially spaced therefrom as depicted.

The engine crankshaft 26 is affixed to the engine flywheel 16. For this purpose, the shaft 26 extends through an aperture 28 of the flywheel housing 14 as shown. A circumferentially extending flywheel ring 30 is rigidly affixed to the flywheel 16, and an external clutch cover 32 is secured to the flywheel ring. The clutch cover, the pressure plate 24, and the intermediate plate 22 are all affixed to the flywheel ring 30 in a manner such that all of the respectively described members are permitted to move axially, though non-rotatably, in reference to the flywheel ring. Thus as the flywheel ring 30 rotates during operation of the vehicle engine, the described coupled members all rotate together at the same speed as the ring 30.

Indeed all members as will be described herein always rotate with the flywheel ring 30 with the exception of the pair of friction plates 18, 20 that are clasped, i.e. "clutched", between the axially fixed flywheel 16, the axially movable intermediate plate 22, and the axially movable pressure plate 24 as described above. In addition, it will be appreciated that all of the plates, apart from the plates 18, 20 are annular in shape, as required to permit the transmission input shaft 27 to pass through the centers of each of the plates that rotate with the flywheel ring 30.

Figure 2:
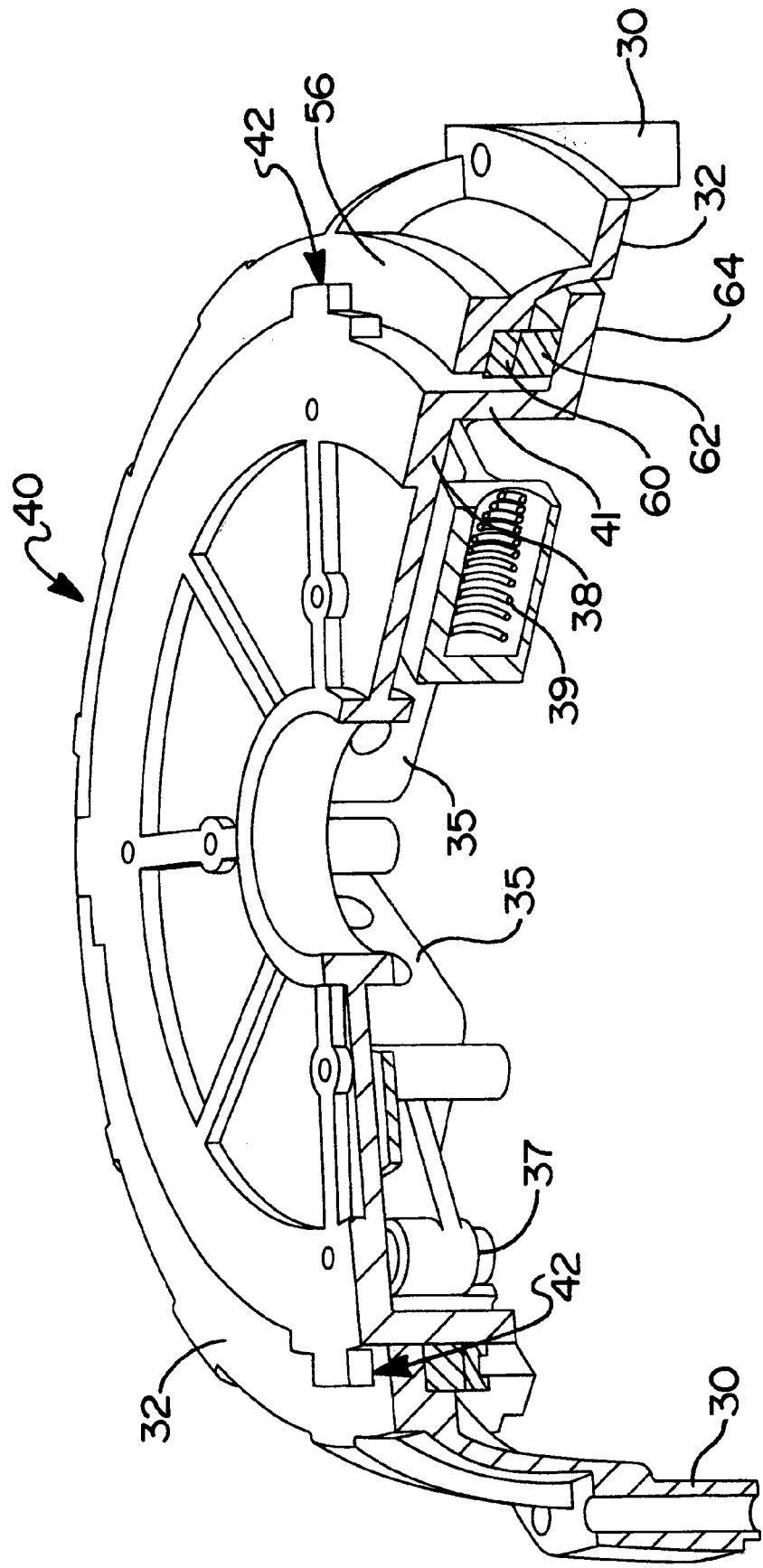
FIG. 2 is a perspective cut away view of a portion of the clutch assembly of FIG. 1, showing components of a centrifugal module employed in one described embodiment of the assembly, including the travel stop system of the present invention.

Continuing reference to FIG. 1, leftward movement of the pressure plate 24 actuates the clutching of the friction plates 18, 20. Referring now also to FIGS. 2 and 3, in order to initiate such clutching, a centrifugal module 40 is provided, the module having a plurality of circumferentially arranged weights 35 pivotally disposed within a housing 38 of the centrifugal module 40. The weights are attached to pivot links 37 fixed to the housing 38, and are adapted to swing radially outwardly via centrifugal force induced by engine speed. The amount of angular pivotal movement of the weights 35 is controlled by compression springs 39 that are secured between the weights 35 and the internal diameter 41 of the housing 38.

The weights 35 along with rollers (not shown) move radially outwardly under centrifugal forces induced by rotation of the engine, as the rollers are attached to the weights. The rollers are axially fixed to the weights 35, and interact with axially movable ramp segments (also not shown) affixed to a ramp plate 36 (FIG. 1). The centrifugally actuated rollers urge the ramp plate leftwardly against the force of a resilient diaphragm spring 34. This action produces the clutching action earlier described, wherein the friction plates 18, 20 become coupled, i.e. rotationally locked, to the flywheel 16, as will be appreciated by those skilled in the art.

The ramp plate 36 (FIG. 1) directly engages the diaphragm spring 34 as depicted in FIG. 1. Thus, it will be appreciated by those skilled in the art that the clutch assembly 10 is automatically actuated as a function of the rotary speed of the crankshaft 26. As the speed of the engine increases, e.g. measured in revolutions per minute of the crankshaft 26, the weights 35 will be urged radially outwardly against the compressive forces of the springs 39. Centrifugal forces on the weights will cause the weights to pivot radially outwardly a distance proportional to the engine speed. In the described embodiment, the clutch 10 will remain disengaged at idle speeds in the range of 750 rpm, as the forces of the springs 39 will be sufficient to counter the centrifugal forces on the weights 35 at that relatively low engine speed. Upon additional engine fueling rates, the engine speed will progress to higher values, resulting in clutch actuation movement initiated by the described rollers against the ramp plate 36. By the time the clutch assembly 10 is rotating at speeds in the range of 1400 rpm, the clutch 10 will be fully engaged, and the friction discs 18, 20 fully clutched.

In accordance with this invention, and referring now particularly to FIG. 3, a plurality of travel stop lugs 42 are disposed circumferentially in spaced regular angular intervals about the external periphery of the housing 38 of the module 40. As was earlier noted, the clutch cover 32 is bolted to the flywheel ring 30. In FIG. 3, it is apparent that the clutch cover periphery has openings through which can be seen one of a plurality of intermediate plate drive straps 44 arranged to circumferentially connect the intermediate plate 22 to the clutch cover 32 by way of connection bolts 46 and 48. This permits the intermediate plate to move axially, or along an axis a-a that defines coincident centerlines of the clutch assembly 10 and the centrifugal module 40. Similarly, the pressure plate 24 is attached to the clutch cover 32 via a plurality of pressure plate drive straps 50 that connect the cover to the pressure plate via connection rivets 52 and bolts 54.

As the friction linings 21 and 23 become worn during the useful life of the clutch, the rollers of the centrifugal module could begin to lose effectiveness with respect to interacting with ramps of the ramp plate 36 for maintaining sufficient clutching forces, as those skilled in the art will appreciate. Thus, a friction wear mechanism is defined by a circumferentially disposed pair of cam segments 60 and 62 (FIG. 2) fixed between a travel lug flange contact surface 56 of the cover 32 and a flange 64 of the housing 38. The segments 60 and 62 rotate relative to one another to accommodate the slack that occurs due to wear, axially spreading respective flanges apart to achieve this desired effect.

A major issue of wear compensation mechanisms such as the cam segments 60 and 62 is their inability to avoid damage to components of the clutch after the wear has progressed beyond certain limits. Thus, even though wear slack has been taken up by the segments 60 and 62, a point can be reached when the friction facings have become so worn that the fasteners retaining the facings to the friction discs 18, 20 become exposed and begin to scour and otherwise damage the surfaces of the flywheel 16, the intermediate plate 22, and the pressure plate 24.

To avoid this condition, the travel lugs 42 have contact surfaces 66 adapted to engage a complementary radially extending flange contact surface 56 of the cover 32 after a prescribed distance D is accommodated for slack due to friction lining wear (FIG. 3). Thus at the point that the lugs 42 engage the surface 56, no further wear adjustment will be achieved by the cam segments 60 and 62. The distance D therefore defines the full wear travel of the centrifugal module 40 relative to the clutch cover 32. The lugs 42 will also provide a travel limit for protection of the drive straps 44 and 50 during shipment of the clutch, as drive straps are occasionally overstressed during movements that occur prior to installation of such clutch assemblies in vehicles.

Figure 5:
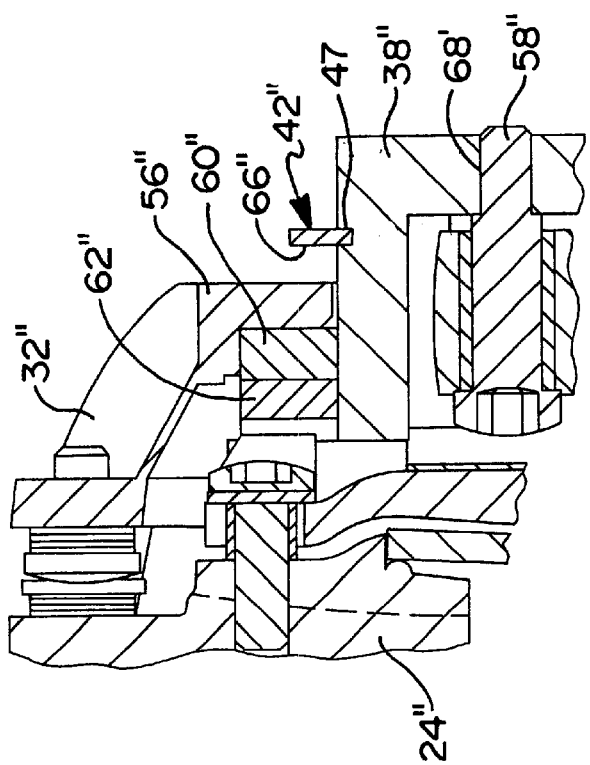
FIG. 5 is a cross-sectional view of a third embodiment of the travel stop system of the present invention.
Figure 4:
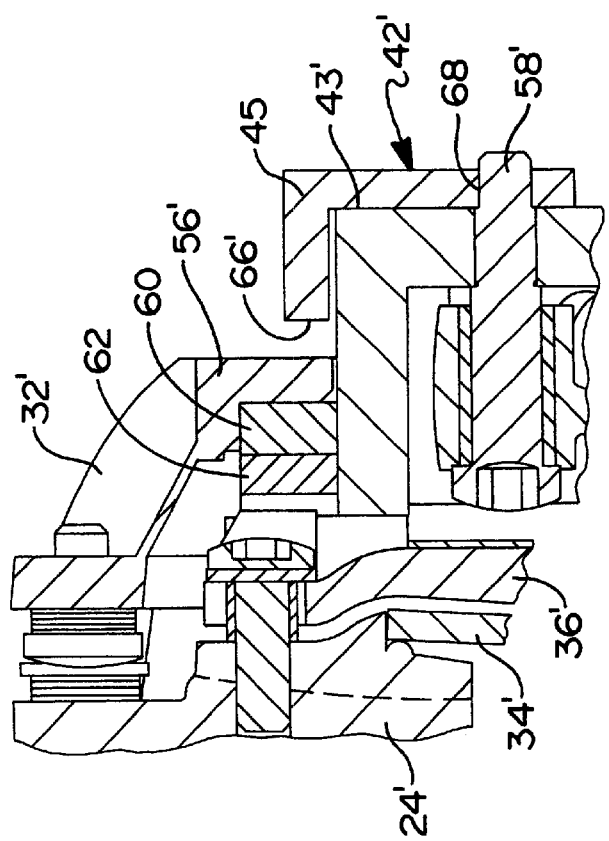
FIG. 4 is a cross-sectional view of a second embodiment of the travel stop system of the present invention.

Referring now to FIGS. 4 and 5, second and third embodiments 42' and 42" of the clutch travel stop lug 42 are shown. Referring to FIG. 4, the travel stop lug 42' is shown in cross-section as a cup-shaped structure that is secured to a threaded stud 58' that extends from the rear 43' of the module 40. In cross-section, the travel stop lug 42' has an axially depending leg 45 with a contact surface 66', and a complementary threaded aperture 68 for securement to the threaded stud 58' of the module 40. In accordance with the aforedescribed concept of the invention, the contact surface 66' is adapted to engage the flange contact surface 56' prior to complete wear of the friction linings 21, 23, thus avoiding issues of over adjustment attributable to wear compensation. Although the second embodiment of the travel stop lug 42' may be cup-shaped, the stop lug 42' may also be into two separate pieces, wherein the cross-section will still be as shown in FIG. 4. In addition, there will normally be a nut (not shown) secured to the threaded stud 58' for affixing the lug 42' in place against the rear 43' of the module 40.

Finally, FIG. 5 displays a travel stop lug 42" that is in the form of a washer circumferentially disposed within an annular slot 47 in the body of the housing 38". Similarly, the lug 42" has a contact surface 66" adapted to limit against likelihood of over adjustment attributable to wear compensation.

It is to be understood that the above description is intended to be illustrative and not limiting. Many embodiments will be apparent to those skilled in the art upon reading the above description. The scope of the invention should be determined, however, not with reference to the above description, but with reference to the appended claims with full scope of equivalents to which such claims are entitled.

What is claimed is:

1. A clutch wear travel stop adapted for limiting clutch component wear adjustment of a vehicular clutch, said clutch defining a longitudinal axis, and having a centrifugal actuation module attached to a circumferentially disposed cover secured to an axially fixed flywheel, said clutch including clutch components disposed within said cover and axially moveable relative to said flywheel between said flywheel and said actuation module, said components including a friction disc having at least one friction clutch lining adapted to engage said flywheel, a wear compensation mechanism disposed between a radially extending portion of said cover and said module, said module defining a housing secured to but axially moveable with respect to said cover; said travel stop comprising a radially extending protuberance disposed on an outer circumferential periphery of said housing, said protuberance being axially spaced from said portion of said cover to limit axial travel of said housing, wherein an extent of permissible adjustment of the clutch via said wear compensation mechanism can be measured via said housing movement, wherein said adjustment is limited via physical contact of said portion of said cover with said protuberance, and whereby an over-adjustment condition of said clutch lining may be avoided.

2. The clutch wear travel stop of claim 1, wherein said contact of said cover portion by said protuberance minimizes potential damage to said clutch components via avoidance of an over-worn condition of said clutch lining.

3. The clutch wear travel stop of claim 2, wherein said protuberance is a lug that is integral with said housing.

4. The clutch wear travel stop of claim 3, further comprising a plurality of said lugs, each spaced circumferentially about said housing.

5. A clutch wear travel stop adapted for limiting clutch component wear adjustment of a vehicular clutch, said clutch defining a longitudinal axis, and having a centrifugal actuation module attached to a circumferentially disposed cover secured to an axially fixed flywheel, said clutch including clutch components disposed within said cover and axially moveable relative to said flywheel between said flywheel and said centrifugal module, said components including a friction disc having at least one friction clutch lining adapted to engage said flywheel, a wear compensation mechanism disposed between a radially extending portion of said cover and said centrifugal module, said module defining a housing secured to but axially moveable with respect to said cover; said housing further comprising an axially extending stud, and said travel stop further comprising a cup-shaped member having a cross-section formed of a radial portion and two orthogonally axially depending portions, said radial portion having a threaded aperture concentrically positioned therethrough, and adapted for securement to said stud; said orthogonally axially depending portions comprising contact surfaces adapted to engage said portion of said cover for limiting said relative movement between said cover and said module, whereby extent of permissible adjustment of the clutch via said wear compensation mechanism can be measured via said housing movement, and wherein said adjustment is limited via physical contact of said portion of said cover with said contact surfaces.

6. The clutch wear travel stop of claim 5, wherein said orthogonally axially depending portions define circumferentially spaced members each comprising a contact surface, wherein each contact surface is spaced at regular intervals about the circumference of said housing.

7. The clutch wear travel stop of claim 6, wherein said clutch further comprises drive straps adapted to connect said axially movable clutch components to said cover for rotationally fixed movement therewith, wherein said travel stop movement against said portion of said cover prevents overstressing of said drive straps.

8. A clutch wear travel stop adapted for limiting clutch component wear adjustment of a vehicular clutch, said clutch defining a longitudinal axis, and having a centrifugal actuation module attached to a circumferentially disposed cover secured to an axially fixed flywheel, said clutch including clutch components disposed within said cover and axially moveable relative to said flywheel between said flywheel and said centrifugal module, said components including a friction disc having at least one friction clutch lining adapted to engage said flywheel, a wear compensation mechanism disposed between a radially extending portion of said cover and said centrifugal module, said module defining a housing secured to but axially moveable with respect to said cover, and said housing comprising an annular groove in an outer circumferential periphery of said housing; said travel stop comprising an annular washer fixed to said groove, said washer being axially spaced from said portion of said cover to limit axial travel of said housing, whereby an extent of permissible adjustment of the clutch via said wear compensation mechanism can be measured via said housing movement, and wherein said adjustment is limited via physical contact of said portion of said cover with said washer.

9. A clutch wear travel stop adapted for limiting clutch component wear adjustment of a vehicular clutch, said clutch defining a longitudinal axis, and having a centrifugal actuation module attached to a circumferentially disposed cover secured to an axially fixed flywheel, said clutch including clutch components disposed within said cover and axially moveable relative to said flywheel between said flywheel and said actuation module, said components including a friction disc having at least one friction clutch lining adapted to engage said flywheel, a wear compensation mechanism disposed between a radially extending portion of said cover and said module, said module defining a housing secured to but axially moveable with respect to said cover; said travel stop comprising a radially extending member fixed relative to said housing, said member being axially spaced from said portion of said cover and adapted to limit axial travel of said housing upon a worn condition of said friction clutch lining, wherein an extent of permissible adjustment of the clutch via said wear compensation mechanism can be measured via said housing movement, wherein said adjustment is limited via physical contact of said portion of said cover with said member, and whereby an over-adjustment condition of said clutch lining may be avoided.

* * * * *